United States Patent
Park et al.

(10) Patent No.: US 6,621,486 B2
(45) Date of Patent: Sep. 16, 2003

(54) EXPANDED TOUCH PANEL DISPLAY

(75) Inventors: Ilwhan Park, Pleasanton, CA (US); Jae H. Shim, San Jose, CA (US); Alex Berelovich, Pleasanton, CA (US); John F. Schipper, Palo Alto, CA (US)

(73) Assignee: Mobigence, Inc., San Jose, CA (US)

( * ) Notice: Subject to any disclaimer, the term of this patent is extended or adjusted under 35 U.S.C. 154(b) by 140 days.

(21) Appl. No.: 09/767,468

(22) Filed: Jan. 23, 2001

(65) Prior Publication Data

US 2002/0097228 A1 Jul. 25, 2002

(51) Int. Cl.[7] .................................................. G09G 5/00
(52) U.S. Cl. ...................... 345/173; 178/18.05; 345/174
(58) Field of Search ........................... 178/18.05, 18.01, 178/18.06, 18.07, 18.03; 345/174, 173, 179, 175, 176, 177, 178; D14/389

(56) References Cited

U.S. PATENT DOCUMENTS

| | | | | |
|---|---|---|---|---|
| 4,001,677 A | * | 1/1977 | Kleinschmidt | 324/699 |
| 4,587,378 A | * | 5/1986 | Moore | 345/173 |
| 4,625,075 A | * | 11/1986 | Jaeger | 178/18.03 |
| 4,645,869 A | * | 2/1987 | Rockwell et al. | 178/18.08 |
| 4,818,827 A | * | 4/1989 | Ipcinski et al. | 200/5 A |
| 4,897,511 A | * | 1/1990 | Itaya et al. | 178/18.05 |
| 5,134,253 A | * | 7/1992 | Doubrava | 178/18.07 |
| 5,159,159 A | * | 10/1992 | Asher | 178/18.05 |
| 5,432,304 A | * | 7/1995 | Tanahashi | 178/18.02 |
| 5,530,209 A | * | 6/1996 | Watanabe et al. | 178/18.05 |
| 5,563,381 A | * | 10/1996 | Crooks et al. | 178/18.03 |
| 5,712,662 A | * | 1/1998 | Miyazaki et al. | 345/173 |
| 5,818,430 A | * | 10/1998 | Heiser | 345/174 |
| 5,852,260 A | * | 12/1998 | Yoshikawa | 178/18.01 |
| 5,854,451 A | * | 12/1998 | Miyazaki et al. | 178/18.05 |
| 5,949,408 A | * | 9/1999 | Kang et al. | 345/169 |
| 5,977,491 A | * | 11/1999 | Aiba | 178/18.01 |
| 6,239,790 B1 | * | 5/2001 | Martinelli et al. | 345/174 |
| 6,259,491 B1 | * | 7/2001 | Ekedahl et al. | 349/23 |
| 6,304,251 B1 | * | 10/2001 | Ito et al. | 345/173 |
| 6,373,475 B1 | * | 4/2002 | Challis | 345/174 |

* cited by examiner

*Primary Examiner*—Steven Saras
*Assistant Examiner*—Leland R. Jorgensen
(74) *Attorney, Agent, or Firm*—John F. Schipper

(57) ABSTRACT

Apparatus for a touch sensitive panel or input screen for a hand held computing device that provides increased active or key area for the input screen. Four wires, each connected to one of the electrodes, are divided into smaller two-wire and one-wire units, with two of the four wires being connected to a signal processor from opposed locations on a boundary of the input screen. Replacing a conventional four-wire unit with this arrangement, the active or key area on the input screen can be increased by as much as 10–14 percent on a typical hand held device, or one or more dimensions of the device housing can be reduced. The four wire connection may be replaced by a three wire connection.

11 Claims, 7 Drawing Sheets

EXPANDED TOUCH PANEL DISPLAY

FIELD OF THE INVENTION

This invention relates to a touch sensitive panel in a hand held computing device.

BACKGROUND OF THE INVENTION

Touch sensitive panels, referred to as "input screens" herein, are widely used for hand held devices, including personal digital assistants, radiotelephones and other hand-held wireless devices. An input screen with a resistive overlay (e.g., indium tin oxide) includes upper and lower transparent input layers positioned above a display screen, such as an LCD array, where each input layer includes two electrodes and a sequence of parallel, electrically resistive paths between the two electrodes. For a conventional touch panel, the upper layer is flexible and the lower layer is relatively inflexible, often being constructed from glass or a hard plastic. When a user uses a stylus or other appendage to touch the input screen at a selected location, the upper and lower input layers contact each other, generating a signal that identifies an x-coordinate (horizontal) and a y-coordinate (vertical) for the touched location relative to the display screen image. A conventional input screen requires at least four wires, one for each electrode, positioned between upper and lower input layers, to provide reference voltages and/or to transfer location information signals from an electrode to electronic components that process these signals. A conventional input screen will group all four wires as a unit and will route the wires along several edges of the input screen to the appropriate electrode. The device usually has one relatively inflexible tail that includes the four wires. The tail is usually bulky and requires provision of additional room around the input screen in which to fit the tail.

One result of this approach is that presence of the tail requires provision of a relatively large, non-usable border, referred to herein as a "routing zone", on one or two sides of the four sides of the input screen, to provide room for the tail. A second result of this approach is that the portion of the device housing that surrounds the input screen is non-symmetric, being noticeably wider on each of one or two sides than on the opposite side(s). A third result is that the key area (bounded by the four electrodes; the region where the alphanumeric characters and graphics appear on the display screen) of the input screen is reduced substantially, by as much as 10–14 percent, relative to the input screen key area that would be available if the four-wire tail were not present. A fourth result of this approach is that the tail, when received within the device housing, is relatively inflexible and cannot be easily reconfigured to fit into the routing zone for wiring of the input screen and other components.

What is needed is an approach that (1) reduces the width of a routing zone that must be allocated to a tail within the device housing, (2) allows an increase in the input screen key area, (3) allows a reduction in one or more dimensions of the device housing without increasing any other dimension of the device housing, and (4) allows the key area to appear in a symmetric and more pleasing arrangement as part of the device housing.

SUMMARY OF THE INVENTION

These needs are met by the invention, which in one embodiment divides a four-wire tail into two or more tails, each carrying one or two wires, that are routed within the routing zone around the input screen in a more symmetric arrangement. Two of the four electrodes provide separate reference voltages used to operate the input screen. In one embodiment, a four-wire tail is divided into first and second two-wire tails, with a first tail serving the top electrode and the left-hand (or right-hand) electrode and a second tail serving the bottom electrode and the right-hand (or left-hand) electrode. The first and second two-wire tails are arranged to lie along the left side and right side, respectively, of the input screen, or along the top side and the bottom side, respectively, of the input screen. Because each two-wire tail has approximately the same routing width, which is reduced relative to the width consumed by a single four-wire tail, the input screen key area is or can be made symmetric relative to the device housing; and this size of the key area is increased compared to the size of the key area that would be available where a single four-tail must be accommodated within the routing zone. Alternatively, one or more dimensions (length and/or width) of the device housing can be reduced using the invention, relative to the corresponding dimension(s) of a housing with a conventional four-wire connector tail, without increasing any other dimension of the device housing.

In another embodiment, the four wires are replaced by three wires, where two wires are required to provide reference voltages. The wires are attached to the input screen at different locations so that one or more wires is positioned along each side (left, right, top and bottom). This allows use of reduced routing zone width along the sides and an increase in key area for the input screen.

DESCRIPTION OF BEST MODES OF THE INVENTION

Figure 1A:
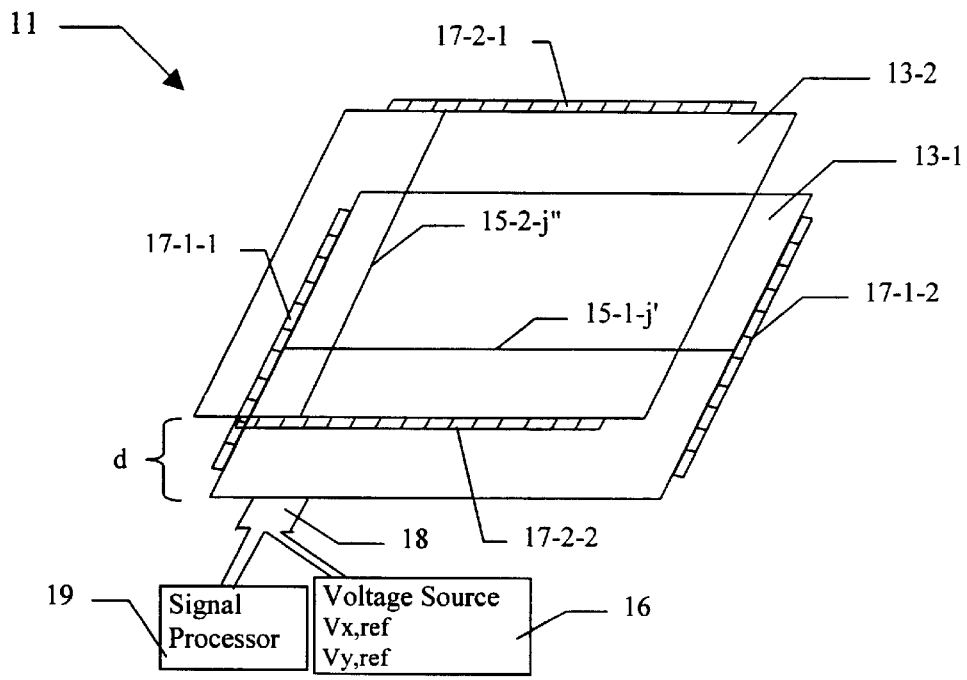
FIGS. 1A and 1B are a perspective view and a top view of a conventional input screen, illustrating routing of wires with a conventional four-wire tail.

FIG. 1A is a perspective view of an input screen system 11 in the prior art, showing first and second input layers 13-$i$ ($i=1, 2$) that are approximately parallel to, and spaced apart by a distance $d=0.03–0.2$ mm from, each other by spacers with diameters as small as 0.07 mm. The input layer 13-1 includes a first sequence of thin, electrically resistive, horizontally oriented paths 15-1-$j'$ ($j'=1, 2, \ldots, J1$) connected between a first vertically oriented electrode 17-1-1 (left side) and a second vertically oriented electrode 17-1-2 (right side), where the electrodes 17-1-1 and 17-1-2 are located at the left and right edges, respectively, of the input layer 13-1. The input layer 13-2 includes a second sequence of thin, electrically resistive, vertically oriented paths 15-2-$j''$ ($j''=1$, 2, ..., J2) connected between a first horizontally oriented electrode 17-2-1 (top side) and a second horizontally oriented electrode 17-2-2 (bottom side), where the electrodes 17-2-1 and 17-2-2 are located at the top and bottom edges, respectively, of the input layer 13-2. The input layers 13-1 and 13-2 may be spaced apart by a sequence of non-conductive spacers or posts of height d, except where the two input layers are pressed together by a stylus or other appendage.

Two of the four electrodes, for example, 17-1-1 and 17-2-2, provide reference voltages, $V_{x,ref}$ and $V_{y,ref}$, for operation of the input screen, using two of the four wires to connect these two electrodes to a pair of voltage sources, 16-1 and 16-2. The other two electrodes, 17-1-2 and 17-2-1, serve as return paths for voltage signals that are received along the electrically resistive paths, 15-1-$j'$ and 15-2-$j''$. The four electrodes are connected through a four-wire tail 18 to a signal processor 19 that receives and analyzes at least two of the four electrode signals and estimates the input screen coordinates (x,y) where the two paths, 15-1-$j'$ and 15-2-$j''$, contact.

When a stylus, the user's finger or another appendage depresses the upper of the two input layers 13-2, the two input layers, 13-1 and 13-2, are brought together and make electrical contact at the point of depression. As a result of this action, at least one horizontally oriented path 15-1-$j'$ makes electrical contact with at least one vertically oriented path 15-2-$j''$, and a voltage signal or group of signals identifying the particular paths, 15-1-$j'$ and 15-2-$j''$, is sent through one or both of the corresponding paths, through the two electrodes 17-1-2 and 17-2-1, and through the four-wire tail 18 to the signal processor 19. The signal processor 19 analyzes these signals and identifies at least one location, with coordinates (x,y), on the input layers, 13-1 and 13-2, corresponding to the point of contact.

Figure 1B:
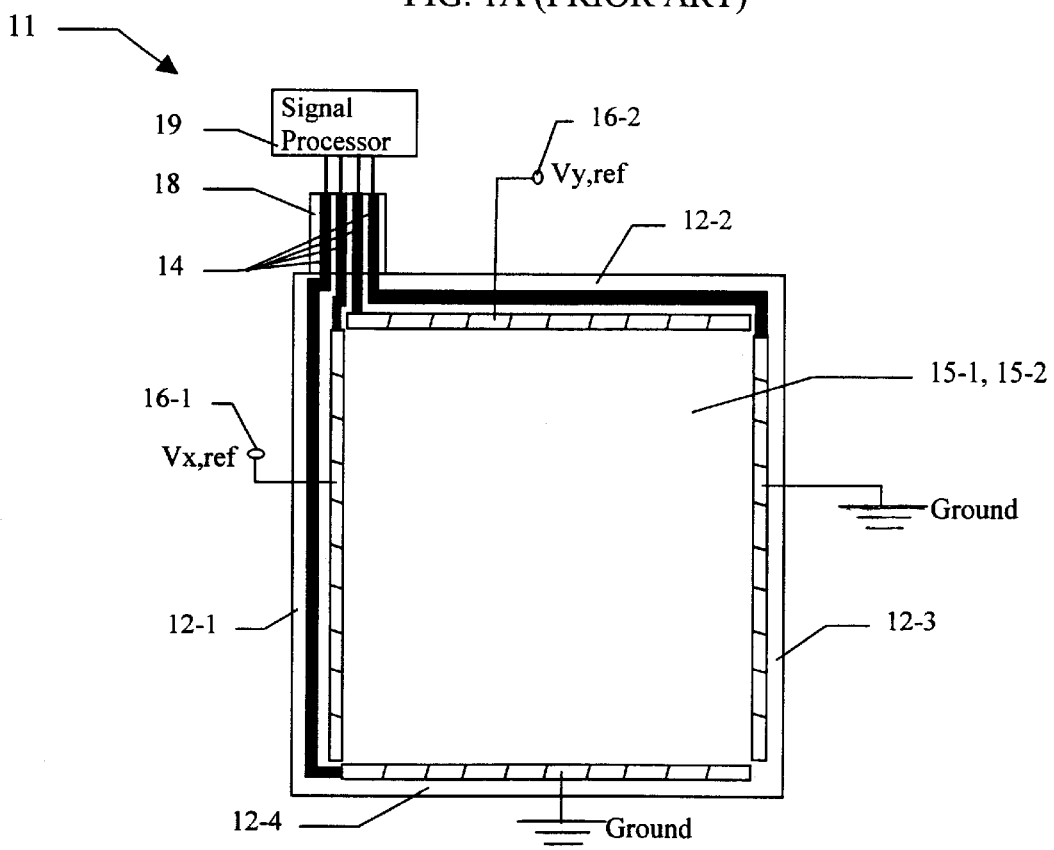

FIG. 1B is a top view of the input screen system 11 in FIG. 1A, showing a typical routing of the wires within a routing zone 12. Typically, the routing zone 12 requires two relatively wide regions, 12-1 and 12-2, and two narrower regions, 12-3 and 12-4, to accommodate a four-wire tail 14.

Figure 2:
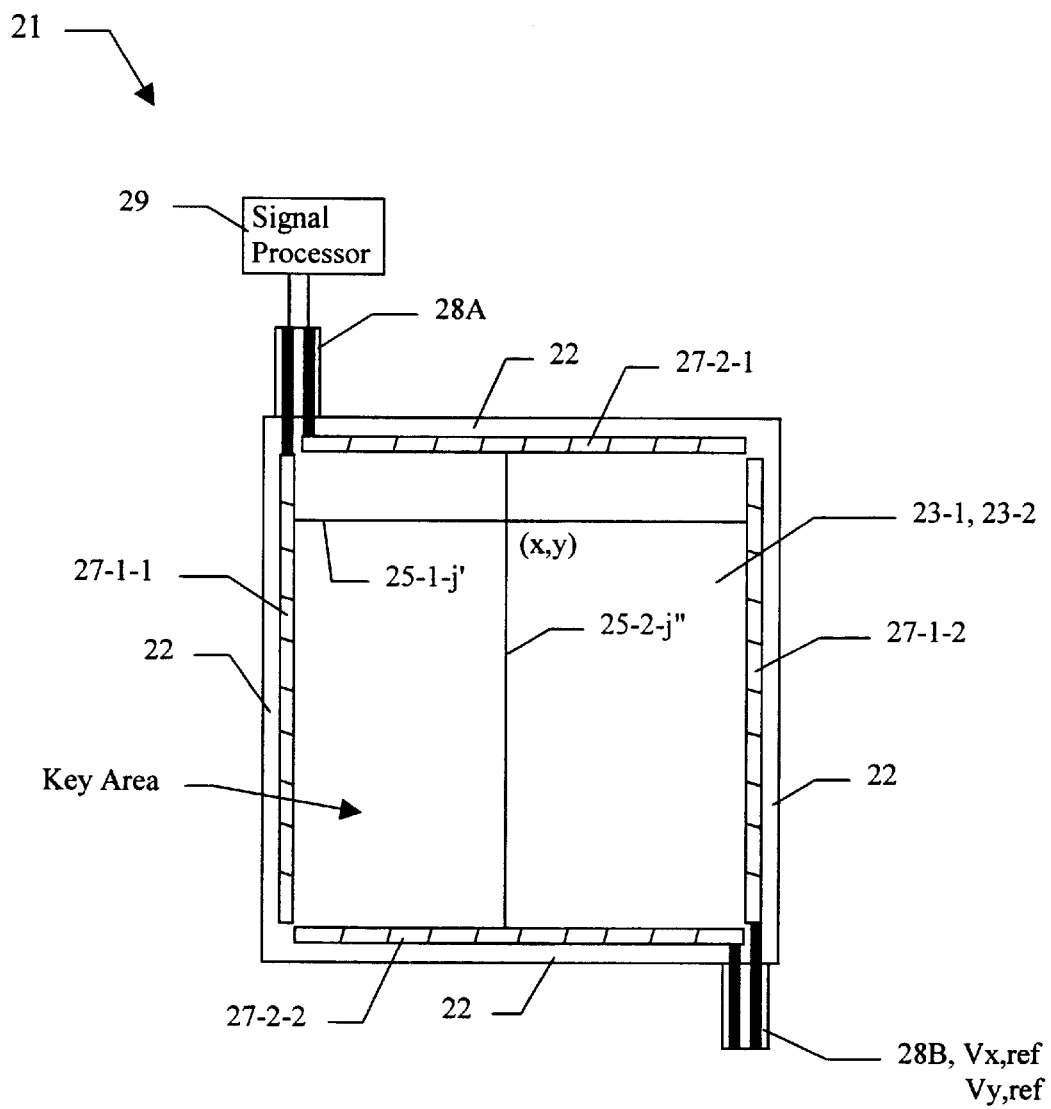
FIG. 2 illustrates use of two two-wire tails according to an embodiment of the invention.

FIG. 2 illustrates operation of an input screen system 21 in one embodiment of the invention. The four-wire tail 18 of FIG. 1 is replaced by two two-wire tails, 28A and 28B, with each two-wire tail serving two of four electrodes, 27-1-1, 27-1-2, 27-2-1 and 27-2-2, each of which is electrically connected to a sequence of paths, 25-1-$j'$ ($j'$=1, ... J1) or 25-2-$j''$ ($j''$=1, 2, ..., J2), that serve the same purpose as the two sequences of paths, 15-1-$j'$ and 15-2-$j''$, in FIG. 1. The two two-wire tails, 28A and 28B, are preferably connected at two opposed locations on the input screen, such as top right and bottom left (shown in FIG. 2), or top left and bottom right, or top center and bottom center, or right center and left center, to allow more efficient distribution of voltages and other signals between two input layers, 23-1 and 23-2, and a signal processor 29. The signal processor 29 receives and analyzes signals from at least two of the four electrodes, 27-1-1, 27-1-2, 27-2-1 and 27-2-2, to determine the input screen coordinates (x,y) of the location where at least one of the paths 25-1-$j'$ contacts at least one of the paths 25-2-$j''$. By replacing the four-wire tail of FIG. 1 by a first two-wire tail 28A and a second two-wire tail 28B, which are preferably connected to the signal processor 29 from opposed locations on the input screen boundary, the numerical area of the routing zone otherwise consumed by the four-wire tail in the routing zone 22 is reduced on two sides (e.g., the left side and the top side), resulting in an increase in numerical area of the key area.

Figure 3:
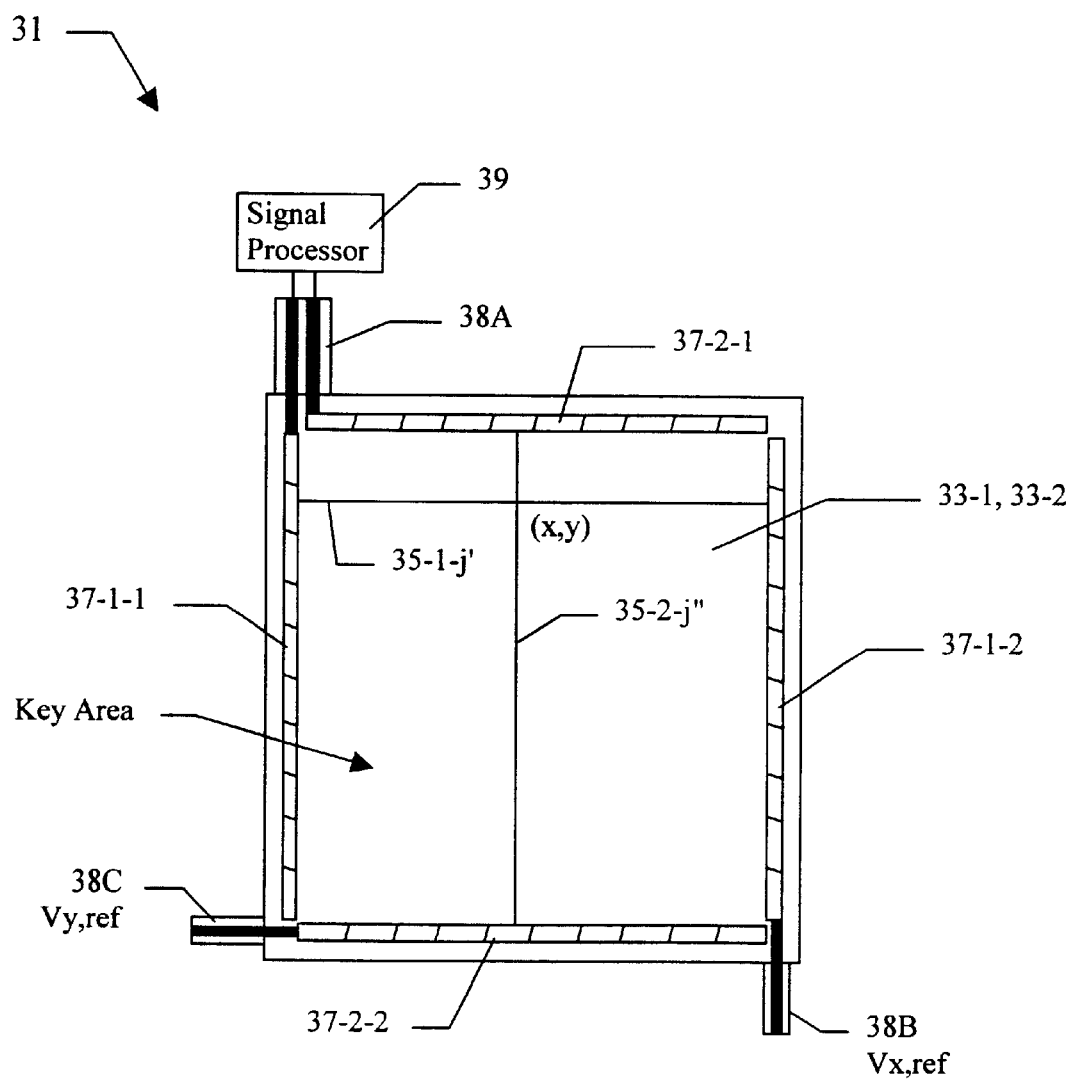
FIG. 3 illustrates use of two one-wire tails and one two-wire tail according to an embodiment of the invention.
Figure 4:
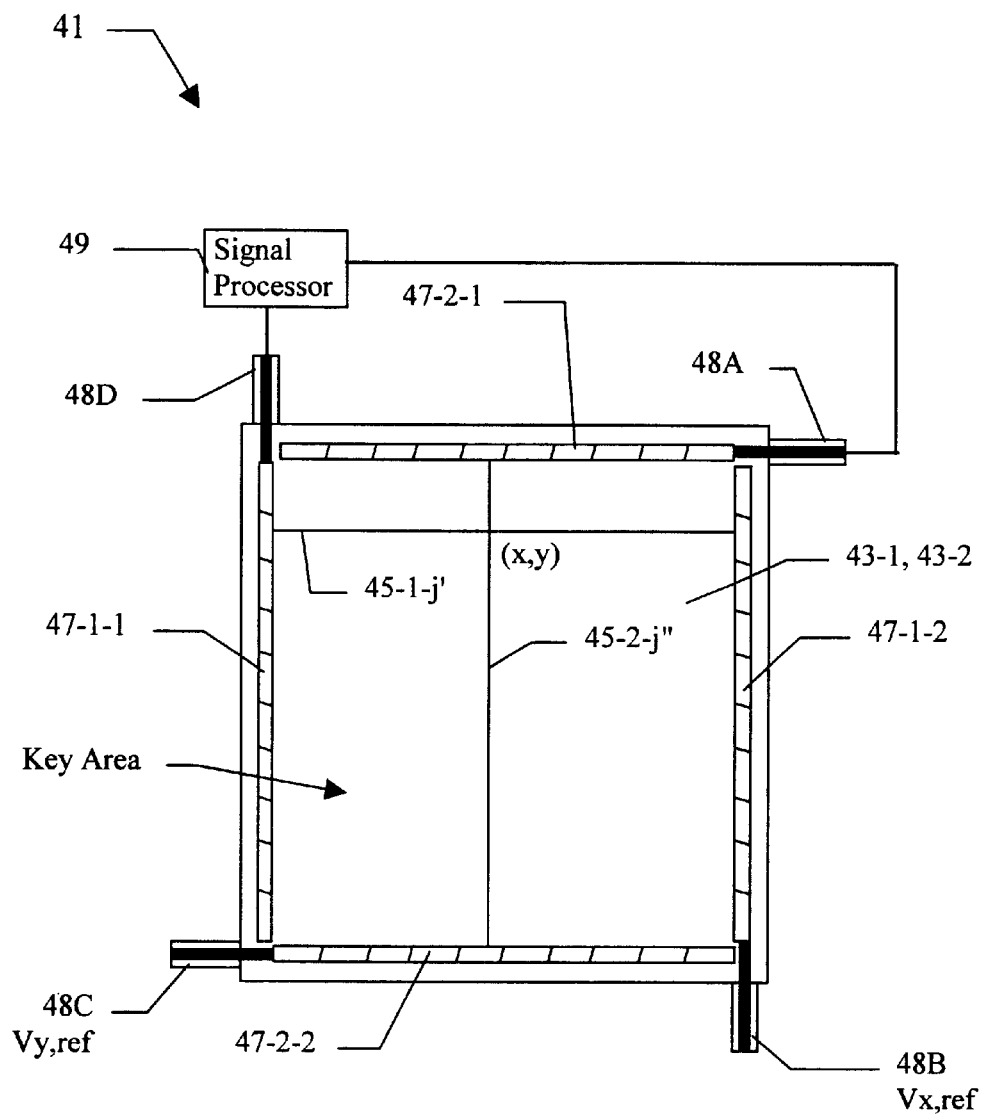
FIG. 4 illustrates use of four one-wire tails according to an embodiment of the invention.
Figure 5:
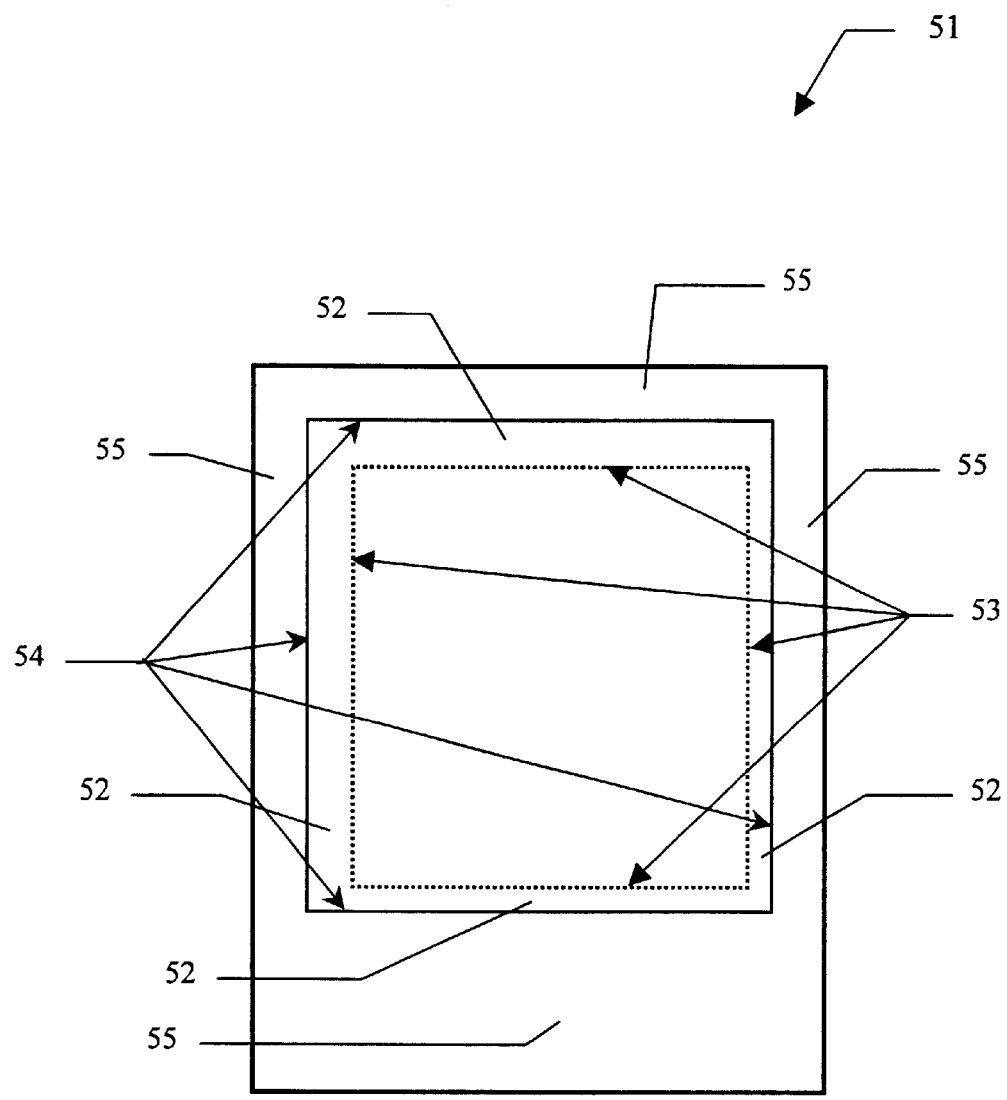
FIG. 5 is a top view of a key area and routing zone of an input screen, comparing the viewable area provided by use of a single four-wire tail and of two two-wire tails

FIG. 3 illustrates operation of an input screen 31 where a two-wire tail 38A and two one-wire tails, 38B and 38C, serve first and second touch screen layers, 33-1 and 33-2. At least one of the tails, 38A, 38B and 38C, is connected to a signal processor 39. FIG. 4 illustrates operation of an input screen 41, where four one-wire tails, 48A, 48B, 48C and 48D, serve first and second input layers, 43-1 and 43-2. At least two of the tails, 48A, 48B, 48C and 48D, are connected to a signal processor 49.

Where a four-wire tail is employed to provide signal transport for the signals delivered to or received from the four electrodes, 17-1-1, 17-1-2, 17-2-1 and 17-2-2, as in FIG. 1, the tail 18 has substantial width and must be accommodated on at least two sides of the input screen, within the routing zone 52, by reducing the size of the key area 53, enclosed in dotted lines in FIG. 5. Note that, where the key area 53 is used, the configuration of the input screen 51 in FIG. 5 is non-symmetrical relative to the device housing 55, because extra routing zone width must be provided on one side or two sides (the left side and the top side in the example in FIG. 5) for the four-wire tail.

Where the two two-wire tails, 28A and 28B in FIG. 2, are employed for signal transport, the widths of one or two regions of the routing zone 22 are reduced substantially, and the key area 54 of the resulting input screen, enclosed in solid lines in FIG. 5, is increased in size and may be made symmetrical relative to the device housing 55. Each two-wire tail, 28A and 28B, is preferably positioned along a separate side, right, left, top and/or bottom, of the key area of the input screen 51. For a 15-line input screen 51, we estimate that the numerical area of the key area in a representative hand held computing device is 4.8 cm (width)×8.0 cm (height)=38.40 cm² for a four-wire tail, and is 5.1 cm×8.3 cm=42.33 cm² for two two-wire tails, divided as indicated in FIG. 2. Use of two two-wire tails in place of a four-wire tail provides an increase in size of the key area of more than 10 percent in this example. The percentage increase in size of the key area may be greater or less for a different size input screen key area.

Alternatively, in the preceding example, the width of the device housing and/or the length of the device housing can be decreased by 3 mm and by 3 mm, respectively, thus reducing one or more dimensions of the device housing without reducing the legibility of characters and graphics appearing in the key area on the display screen and without requiring an increase in any dimension of the device housing.

One older touch screen technology provides a first tail with two wires and a second contiguous tail with two more wires but appears to require first and second flexible input layers, between which the wires are carried, and a third rigid input layer supporting the first and second input layers. This configuration requires an increase in thickness of the device housing because of the addition of the second flexible input layer.

Figure 6:
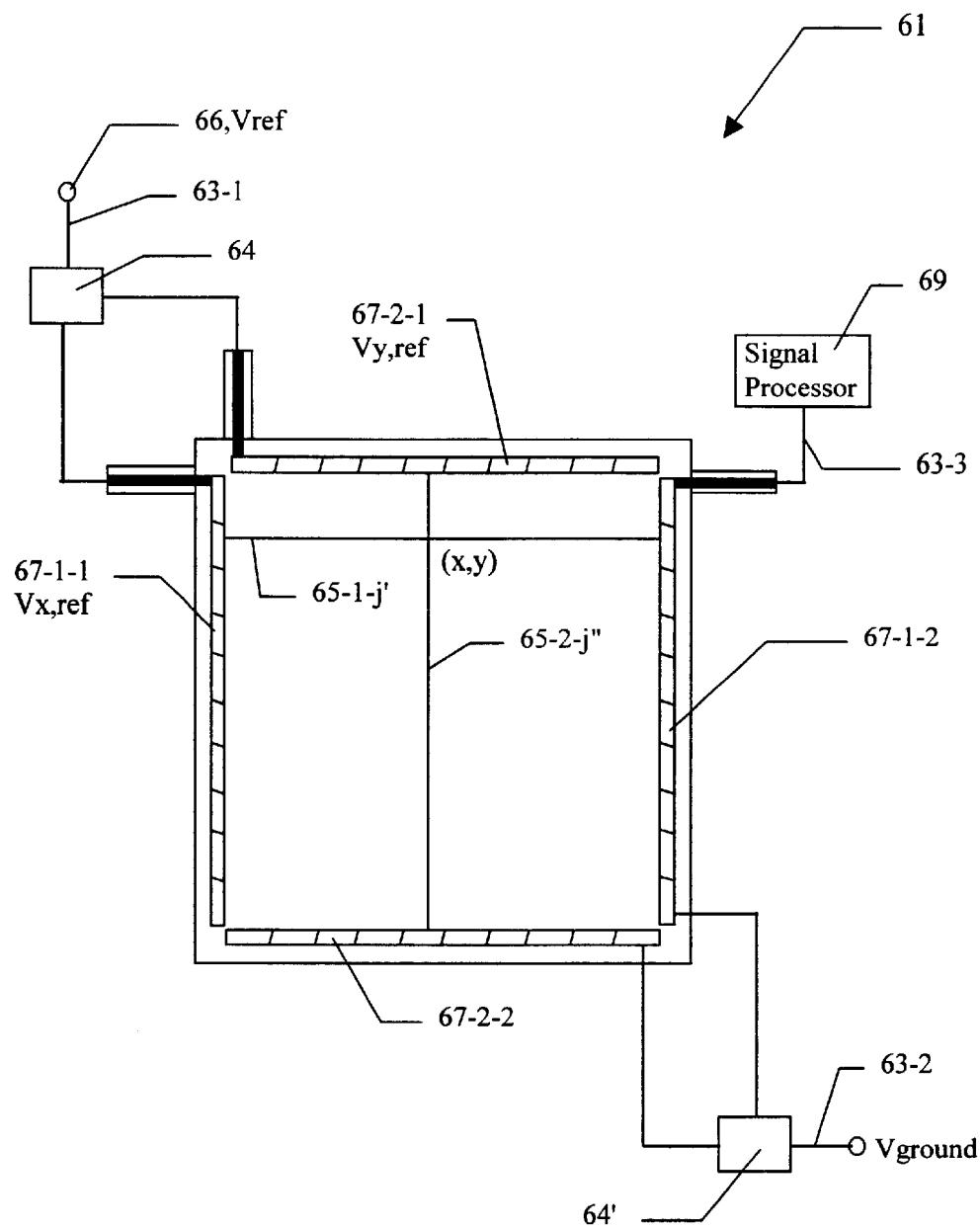
FIG. 6 is a schematic view illustrating a three-wire arrangement for operating an input screen according to the invention.
Figure 7:
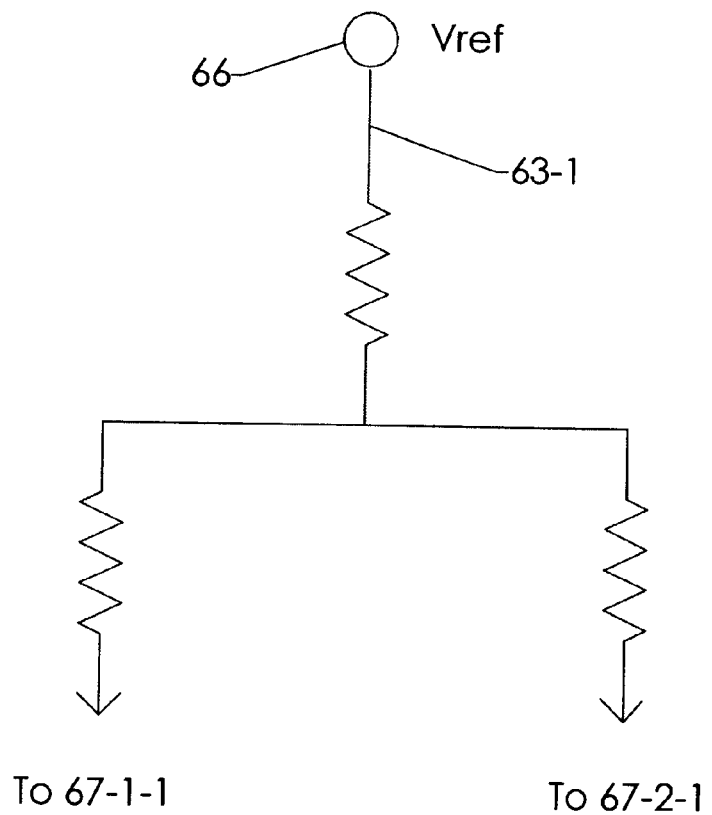
FIG. 7 illustrates a simple voltage step-down circuit.

FIG. 6 schematically illustrates an embodiment of an input screen 61 that uses only three wires. A first wire 63-1 is connected to a voltage source 66 and provides a voltage signal, preferably static, having a voltage value $V_{ref} \geq \max\{V_{x,ref}, V_{y,ref}\}$. Assuming for the sake of illustration that $V_{x,ref} \geq V_{y,ref}$, the first wire 63-1 connects directly to a first electrode 67-1-1 and may be connected to a second electrode 67-2-1 through a voltage step down circuit 64 that adjusts the line voltage from $V_{ref}$ to $V_{x,ref}$ and to $V_{y,ref}$. If $V_{x,ref} = V_{y,ref}$, no step down circuit is required. At least one electrode, shown as 67-1-2 in FIG. 6, is grounded through a second wire 63-2; preferably, another electrode 67-2-2 is also grounded. A second voltage step down circuit 64' for the second wire 63-2 may be provided. The voltage step down circuit 64 may be a simple resistive ladder, illustrated in FIG. 7, or may be a more elaborate circuit. A third wire 63-3 in FIG. 6, provides current measurements at one of the four electrodes for a signal processor 69.

What is claimed is:

1. Apparatus for a touch sensitive panel that allows reduction in width of a wire routing zone, the apparatus comprising:
   a first input layer and a second input layer that is spaced apart from, is parallel to and lies below the first input layer, each of the first and second input layers having a boundary, including a left side, a right side, a top side and a bottom side;
   first and second electrodes, positioned adjacent to the left side and the right side, respectively, of the first input layer, the first and second electrodes being connected by each of a first sequence of two or more electrically resistive paths in the first input layer;
   third and fourth electrodes, positioned adjacent to the top side and the bottom side, respectively, of the second input layer, the third and fourth electrodes being connected by each of a second sequence of two or more electrically resistive paths in the second input layer;
   a first tail including first and second signal carrying wires, located in a routing zone adjacent to the input layer boundaries, where first ends of the first and second wires are connected to the first and third electrodes, respectively, and second ends of the first and second wires are connected to a signal analyzer for electrode signals; and
   a second tail, spaced apart from the first tail and including third and fourth signal carrying wires, located in the routing zone, where first ends of the third and fourth wires are connected to the second and fourth electrodes, respectively, and second ends of the third and fourth wires are connected to a first voltage source and to a second voltage source, respectively.

2. The apparatus of claim 1, wherein said touch sensitive panel is enclosed in a device housing, and at least one of a housing length dimension and a housing width dimension is reduced relative to a housing length dimension and a housing width dimension, respectively, for a touch sensitive panel where said first, second, third and fourth wires are combined and routed as a single tail.

3. The apparatus of claim 1, wherein said touch sensitive panel is enclosed in a device housing having a left side and a right side, and said left side boundary and said right side boundary of at least one of said first input layer and said second input layer are located at an equal distance from the left side and the right side of the housing, respectively.

4. Apparatus for a touch sensitive panel that allows reduction in width of a wire routing zone, the apparatus comprising:
   a first input layer and a second input layer that is spaced apart from, is parallel to and lies below the first input layer, each of the first and second input layers having a boundary, including a left side, a right side, a top side and a bottom side;
   a first and second electrodes, positioned adjacent to the left side and the right side, respectively, of the first input layer, the first and second electrodes being connected by each of a first sequence of two or more electrically resistive paths in the first input layer;
   third and fourth electrodes, positioned adjacent to the top side and the bottom side, respectively, of the second input layer, the third and fourth electrodes being connected by each of a second sequence of two or more electrically resistive paths in the second input layer;
   a first tail including first and second signal carrying wires, located in a routing zone adjacent to the input layer boundaries, where first ends of the first and second wires are connected to the first and third electrodes, respectively, and second ends of the first and second wires are connected to a signal analyzer for electrode signals; and
   a second tail, including a third signal carrying wire, located in the routing zone, the third wire having a first end connected to the second electrode, and having a second end connected to a first voltage source; and
   a third tail, spaced apart, including a fourth signal carrying wire, located in the routing zone, the fourth wire having a first end connected to the fourth electrode, and having a second end connected to a second voltage source, where the second and third tails are spaced apart from each other.

5. The apparatus of claim 4, wherein said touch sensitive panel is enclosed in a device housing, and at least one of a housing length dimension and a housing width dimension is reduced relative to a housing length dimension and a housing width dimension, respectively, for a touch sensitive panel where said first, second, third and fourth wires are combined and routed as a single tail.

6. The apparatus of claim 4, wherein said touch sensitive panel is enclosed in a device housing having a left side and a right side, and said left side boundary and said right side boundary of at least one of said first input layer and said second input layer are located at an equal distance from the left side and the right side of the housing, respectively.

7. Apparatus for a touch sensitive panel that allows reduction in width of a wire routing zone, the apparatus comprising:
   a first input layer and a second input layer that is spaced apart from, is parallel to and lies below the first input layer, each of the first and second input layers having a boundary, including a left side, a right side, a top side and a bottom side;
   first and second electrodes, positioned adjacent to the left side and the right side of the first input layer, the first and second electrodes being connected by each of a first sequence of two or more electrically resistive paths lying in the first input layer;
   third and fourth electrodes, positioned adjacent to the top side and the bottom side of the second input layer, the third and fourth electrodes being connected by each of a second sequence of two or more electrically resistive paths lying in the second input layer;
   a first tail including a first signal carrying wire, located in a routing zone adjacent to the input layer boundaries, connected at a first end to a first selected voltage source, and connected at a second end and at a third end of the first wire to the first electrode and the third electrode, respectively;
   a second tail including a second signal carrying wire, located in the routing zone, connected at a first end to a second selected voltage source, and connected at a second end and at a third end of the second wire to the second electrode and the fourth electrode, respectively; and
   a third tail, spaced apart from the first and second tails and including a third signal carrying wire, located in the routing zone, connected to a signal analyzer at a first end of the third wire and alternatively connectable at a second end of the third wire to the first electrode and to the second electrode for electrode signals.

8. The apparatus of claim 7, wherein said touch sensitive panel is enclosed in a device housing, and at least one of a housing length dimension and a housing width dimension is reduced relative to a housing length dimension and a housing width dimension, respectively, for a touch sensitive panel where said first, second, third and fourth wires are combined and routed as a single tail.

9. The apparatus of claim 7, wherein said touch sensitive panel is enclosed in a device housing having a left side and a right side, and said left side boundary and said right side boundary of at least one of said first input layer and said second input layer are located at an equal distance from the left side and the right side of the housing, respectively.

10. The apparatus of claim 7, further comprising a voltage step down circuit located between said first end and at least one of said second end and said third end of said first wire.

11. The apparatus of claim 7, further comprising a voltage step down circuit located between said first end and at least one of said second end and said third end of said second wire.

\* \* \* \* \*